(12) United States Patent
Wegener (10) Patent No.: US 7,558,685 B2
(45) Date of Patent: Jul. 7, 2009

(54) FREQUENCY RESOLUTION USING COMPRESSION

(75) Inventor: Albert W. Wegener, Portola Valley, CA (US)

(73) Assignee: Samplify Systems, Inc., Santa Clara, CA (US)

(*) Notice: Subject to any disclaimer, the term of this patent is extended or adjusted under 35 U.S.C. 154(b) by 1 day.

(21) Appl. No.: 11/734,967

(22) Filed: Apr. 13, 2007

(65) Prior Publication Data

US 2008/0123731 A1    May 29, 2008

Related U.S. Application Data

(60) Provisional application No. 60/867,734, filed on Nov. 29, 2006.

(51) Int. Cl.
*G01R 15/00* (2006.01)
*G01R 23/16* (2006.01)
*H03M 7/30* (2006.01)

(52) U.S. Cl. .................. 702/57; 341/61; 341/76; 702/77

(58) Field of Classification Search .......... 702/57, 702/75–77; 341/51, 76, 87, 155; 704/200.1, 704/229; 324/76.5
See application file for complete search history.

(56) References Cited

U.S. PATENT DOCUMENTS

| | | | |
|---|---|---|---|
| 5,583,784 A | 12/1996 | Kapust et al. | |
| 5,589,763 A | 12/1996 | Burns | |
| 7,009,533 B1 | 3/2006 | Wegener | |
| 7,071,852 B1 * | 7/2006 | Wegener | 341/61 |

OTHER PUBLICATIONS

It's Time to Get Real, Your Guide to Selecting the Right Real-Time Spectrum Analyzer, Tektronix 2007, pp. 9 pages.
FFT Spectrum Analyzers data sheet, SR780-100 kHz 2-channel dynamic signal analyzer Stanford Research Systems 2003, 6 pages.
Wegener, AL, Compression Solutions for Test Applications, EE Evaluation Engineering, Dec. 2005, 7 pages.
Schiff, Maurice, "Spectrum Analysis Using Digital FFT Techniques," SystemView by Elanix, Application Note AN106A, May 5, 1997, 4 pages.
Agilent Technologies Application Note 1383-1, "Spectral Analysis Using a Deep-Memory Oscilloscope Fast Fourier Transform (FFT) for use with Infiniium 54830B Series Deep-Memory Oscilloscopes," 2001, 20 pages.

(Continued)

*Primary Examiner*—John H Le
(74) *Attorney, Agent, or Firm*—Haynes Beffel & Wolfeld LLP; Carolyn Koenig (57) ABSTRACT

In a frequency analysis system, such as a signal detection system or a spectrum analyzer, the frequency domain resolution is enhanced by compression and decompression of the signal samples. The limited capacity of the data storage and/or data transfer resources limit the number of samples that can be stored or transferred. A compressor forms a compressed signal prior to data transfer or storage. A decompressor decompresses the compressed signal prior to transformation to the frequency domain, by a fast Fourier transform or other frequency domain transform. The frequency domain resolution is enhanced because more decompressed samples are available for the frequency domain transform. The compressor and decompressor apply computationally efficient algorithms that can be implemented to operate in real time.

39 Claims, 9 Drawing Sheets

OTHER PUBLICATIONS

Z-TEC Application Notes, "Oscilloscope Measurement Fundamentals (Part 3 of 3) Frequency Domain Measurements," Feb. 22, 2007, 3 pages.

Wegener, Albert, "Enhanced Time-Interleaved A/D Conversion Using Compression," U.S. Appl. No. 11/458,771, filed Jul. 20, 2006, 57 pages.

Wegener, Albert, "Data Compression for a Waveform Data Analyzer," U.S. Appl. No. 11/553,147, filed Oct. 26, 2006, 69 pages.

Search Report from PCT/US07/85887 issued on Apr. 25, 2008, 11 pages.

* cited by examiner

| Center Frequency 510 | Frequency Band Indicator 520 | Demux Control x(i), x(i-j) 530 | Inverter Control 540 | Modified Sample 550 |
|---|---|---|---|---|
| DC | 1 | x(i), x(i-1) | on = -x(i-1) | y(i) = x(i) - x(i-1) |
| fs/6 | 2 | x(i), x(i-3) | off | y(i) = x(i) + x(i-3) |
| fs/4 | 3 | x(i), x(i-2) | off | y(i) = x(i) + x(i-2) |
| fs/3 | 4 | x(i), x(i-3) | on = -x(i-3) | y(i) = x(i) - x(i-3) |
| fs/2 | 5 | x(i), x(i-1) | off | y(i) = x(i) + x(i-1) |

| Band | Center Freq. | Modified Sample | Example Differences or Sums |
|---|---|---|---|
| 1 | DC | $y(i) = x(i) - x(i-1)$ | x(i):    32767  32702  32508  32186  31737  31163  30465  29648  28713  27666<br>x(i-1):  -----  32767  32702  32508  32186  31737  31163  30465  29648  28713<br>DIFF:    -----    -65   -194   -322   -449   -574   -707   -781   -935  -1047   } 512 |
| 2 | $f_s/6$ | $y(i) = x(i) + x(i-3)$ | x(i):    32767  16628 -15890 -32756 -17356  15140  32722  18071 -14382<br>x(i-3):  -----  -----  -----  32767  16628 -15890 -32756 -17356  15140<br>SUM:     -----  -----  -----     11   -728   -750    -34    715    758   } 522 |
| 3 | $f_s/4$ | $y(i) = x(i) + x(i-2)$ | x(i):    32767   -389 -32758   1166  32730  -1944 -32684   2719  32619  -3494<br>x(i-2):  -----  -----  32767   -389 -32758   1166  32730  -1944 -32684   2719<br>SUM:     -----  -----      9    777    -28   -778     46    775    -65   -775   } 532 |
| 4 | $f_s/3$ | $y(i) = x(i) - x(i-3)$ | x(i):    32767 -15792 -17546  32703 -13977 -19233  32513 -12107 -20845  32198<br>x(i-3):  -----  -----  -----  32767 -15792 -17546  32703 -13977 -19233  32513<br>DIFF:    -----  -----  -----    -64   1815  -1687   -190   1870  -1612   -315   } 542 |
| 5 | $f_s/2$ | $y(i) = x(i) + x(i-1)$ | x(i):    32767 -32671  32382 -31906  31239 -30392  29364 -28166  26801 -25280<br>x(i-1):  -----  32767 -32671  32382 -31906  31239 -30392  29364 -28166  26801<br>SUM:     -----     96   -289    476   -667    847  -1028   1198  -1365   1521   } 552 |

FREQUENCY RESOLUTION USING COMPRESSION

CROSS-REFERENCE TO RELATED APPLICATIONS

Claim is made of the benefit of U.S. Provisional Application No. 60/867,734, filed 29 Nov. 2006.

BACKGROUND OF THE INVENTION

This invention relates to compressing, decompressing and transforming a signal to a frequency domain representation wherein the frequency domain resolution can be improved as a result of compression.

The transformation of a signal to the frequency domain has numerous applications in signal processing, including spectrum analysis, detection and parameter measurement. The accuracy of these techniques depends on the frequency resolution of the frequency domain representation and the signal to noise ratio (SNR). Frequency resolution is inversely proportional to the number of samples of the signal, or the observation interval, used in the calculation of the frequency domain representation of the signal. In signal detection, resolution is important for resolving adjacent narrow peaks in a frequency domain representation. For signal parameter measurement, improved frequency domain resolution increases the accuracy of the parameter estimate, such as the center frequency of a signal. Many types of transformations are known in the art for converting a temporal or spatial domain representation to a frequency or spatial frequency domain representation. For digital or discrete signals these include the discrete Fourier transform (DFT), fast Fourier transform (FFT), discrete cosine transform (DCT), discrete sine transform (DST) and the z-transform. The frequency domain resolution $f_{res}$ corresponds to discrete frequency domain bin width $f_{bin}$ and depends on the sample rate $f_s$ and the number of samples N used to calculate the frequency domain representation by the following relation, $$f_{res} = f_{bin} = f_s / N$$

For the frequency domain resolution smaller is better because it leads to more accurate measurements. However, improving frequency resolution requires a larger number of samples N. This requirement can conflict with system limitations as described below.

Examples in the following discussion will use the FFT for the transformation from the time to frequency domain, but this is not intended to limit the scope of the invention to any particular transformation. Also, in this discussion, "real time" means a rate that is at least as fast as the sample rate of the digital signal. When analog to digital conversion is applied to an analog signal to form the digital signal, the sample rate is the rate at which analog to digital converter (ADC) forms the samples of the digital signal. When digital to analog conversion is applied to a digital signal, the sample rate is the rate at which digital-to-analog converter (DAC) forms the analog signal from the samples of the digital signal is the sample rate. The bit rate of a sampled, or digital, signal is equal to the number of bits per sample multiplied by the sample rate.

Many applications include converting an analog signal to a digital signal followed by a transformation of the digital signal to the frequency domain. When the ADC operates at high speeds, the frequency transformation processor is often too slow to process the flow of samples in real time, creating a bottleneck so that the samples must be stored until they are processed. Another bottleneck can occur when a data transfer interface, such as a bus, cable or network, cannot transfer the samples to the frequency transformation processor fast enough. For example, when the entire data transfer interface is used for transfer of the signal samples, the maximum data transfer bandwidth may be insufficient. Alternatively, when only a portion of the data transfer interface is allocated for transferring the signal samples, such as for example, by time interleaving the sample signals with other time critical data or with multiple streams of sample signals, the allotted bandwidth may be insufficient. In these cases, a capture memory stores the samples until they can be transferred and processed. Other bottlenecks can arise from the capture memory itself. The capacity of the entire memory or the portion of memory allocated for signal samples limits the number of samples received from the ADC that are available to the frequency domain processor. The speed at which the capture memory can receive the signal samples output from the ADC can also create a bottleneck. For example, a capture memory comprising static RAM (SRAM) with access time of 10 nanoseconds, can receive signal samples from an ADC at a sample rate of 100 MHz or less. An application requiring a higher sample rate from a higher speed ADC would require more a expensive memory architecture in order to receive samples at the higher rate. The memory access speed thus limits the real time processing bandwidth achievable by the frequency domain processor.

Compressing the signal can mitigate these limitations by increasing the number of samples in compressed form that can be stored in memory, increasing the rate at which they can be received by memory and increasing the rate of transfer across an data transfer interface. The increased number of samples available for the FFT improves the frequency resolution of the frequency domain representation. The frequency domain resolution is a significant factor for detection. Insufficient frequency domain resolution can cause the detector to fail, as will be demonstrated by an example in the Detailed Description section. Alternatively, when the frequency domain representation has a fixed resolution requirement met by an N-length FFT, compression reduces the storage and/or data transfer requirements for the N samples in compressed form. The capacity of the entire memory or the portion of memory allocated for signal samples can be decreased, thus reducing memory requirements or freeing existing memory for other purposes in the application. The speed required to receive the compressed signal samples by a capture memory is reduced, allowing the use of lower speed memory architectures. The bandwidth needed to transfer the N samples across a data transfer interface is also decreased, so the bandwidth capacity of the data transfer interface or the portion allocated for transfer of signal samples can be reduced. Compression allows more efficient use of memory and data transfer resources, thus lowering the cost of the system.

In the commonly owned U.S. Pat. No. 7,009,533 B1 (the '533 patent), entitled "Adaptive Compression and Decompression of Bandlimited Signals", dated Mar. 7, 2006 and incorporated herein by reference, the present inventor describes algorithms for compression and decompression of certain bandlimited signals. In the commonly owned and copending US Patent Application, application Ser. No. 11/458,771 (the '771 application) entitled, "Enhanced Time-Interleaved A/D Conversion Using Compression," filed on Jul. 20, 2006 and incorporated herein by reference, the present inventor describes compression of a bandlimited signal that is sampled by a parallel time-interleaved analog to digital converter (TIADC). The compression methods described therein are designed to take advantage of the parallel architecture of the TIADC. In the commonly owned and copending US Patent Application, application Ser. No. 11/553,147 (the '147 application), entitled "Data Compression for a Waveform Data Analyzer", filed on Oct. 26, 2006 and incorporated herein by reference, the present inventor describes compression and decompression of a signal having recurring waveform states and teaches algorithms for this particular type of signal.

SUMMARY OF THE INVENTION

An object of the present invention is to produce a frequency domain representation of a signal with improved frequency domain resolution. The signal is compressed prior to storage or transfer using resources with limited capacities. The compressed signal is decompressed before performing a frequency domain transformation allowing more samples to be used for the transform calculations. The compression can be lossless or lossy. The frequency domain transformation includes, but is not limited to, a DFT, FFT, DCT, DST and z-transform.

Another object of the invention is to provide processing appropriate for detection and parameter measurements before and after the frequency domain transformation. The processing can apply window functions, extrapolation, zero-padding, nonlinear functions and peak detection.

An advantage of the present invention is better frequency domain resolution leading to increased accuracy of detection and measurements performed on a frequency domain representation. Adequate frequency resolution is necessary for the success of detectors operating on frequency domain representations.

Another advantage of the present invention is more efficient use of data storage and data transfer resources. Depending on the frequency domain resolution requirements of the application, the data storage capacity or data transfer interface bandwidth can be reduced, resulting in cost reductions.

BRIEF DESCRIPTION OF THE DRAWINGS

FIG. 6 gives examples of modified samples resulting from sums or differences, in accordance with a preferred embodiment.

DETAILED DESCRIPTION

Figure 1:
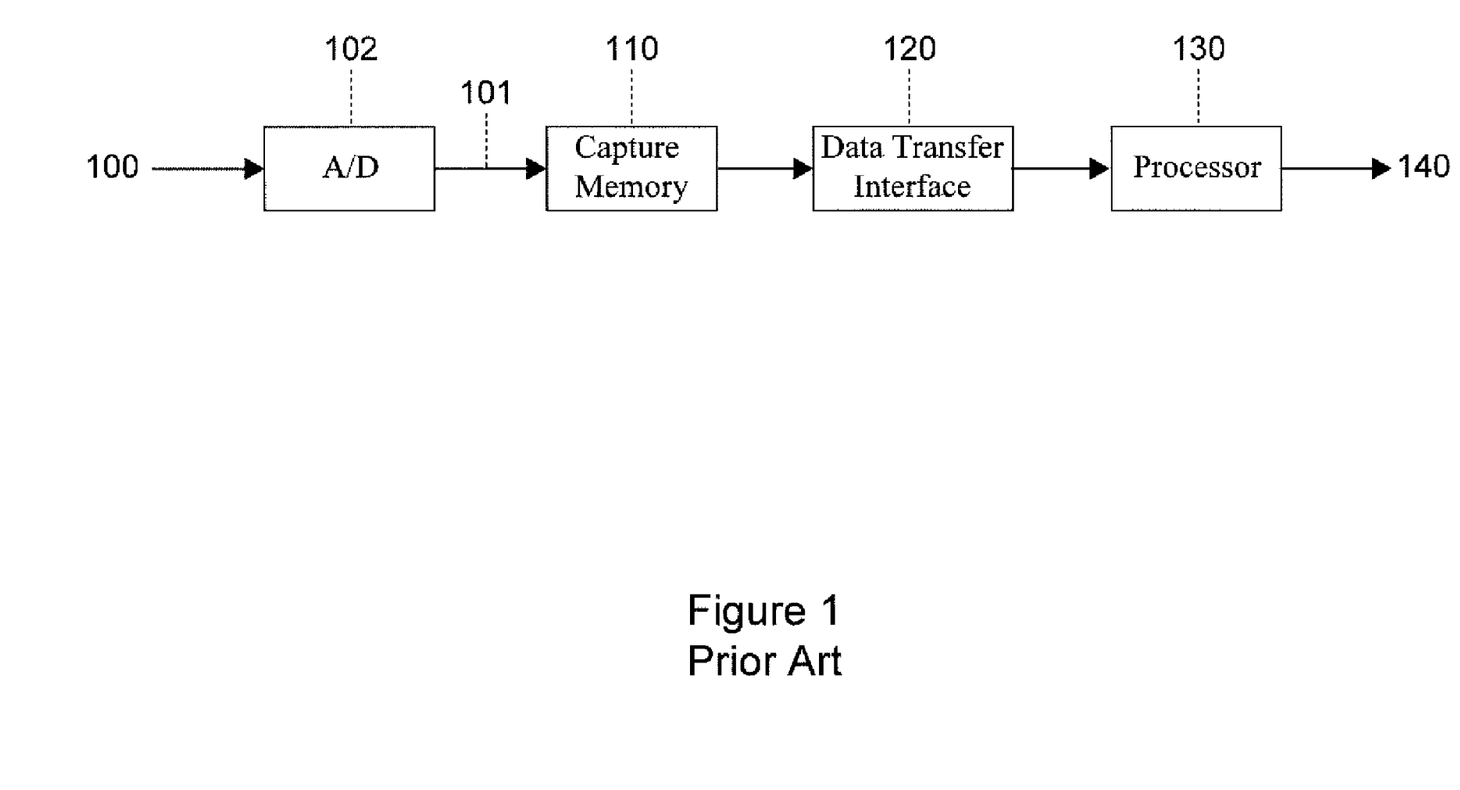
FIG. 1 is a block diagram of a system for capture and frequency analysis of a signal, in accordance with the prior art.

FIG. 1 is a block diagram of an example of a system for capture and analysis of a signal from the prior art. In this example, an analog signal 100 is converted to a digital signal 101 by ADC 102. Samples of the digital signal are stored in capture memory 110. The processor 130 retrieves the stored samples from the capture memory 110 via the data transfer interface 120. The processor calculates a FFT or other transform to produce a frequency domain representation at the processor output 140. In a spectrum analyzer device, the processor output 140 is further processed for display.

Figure 2:
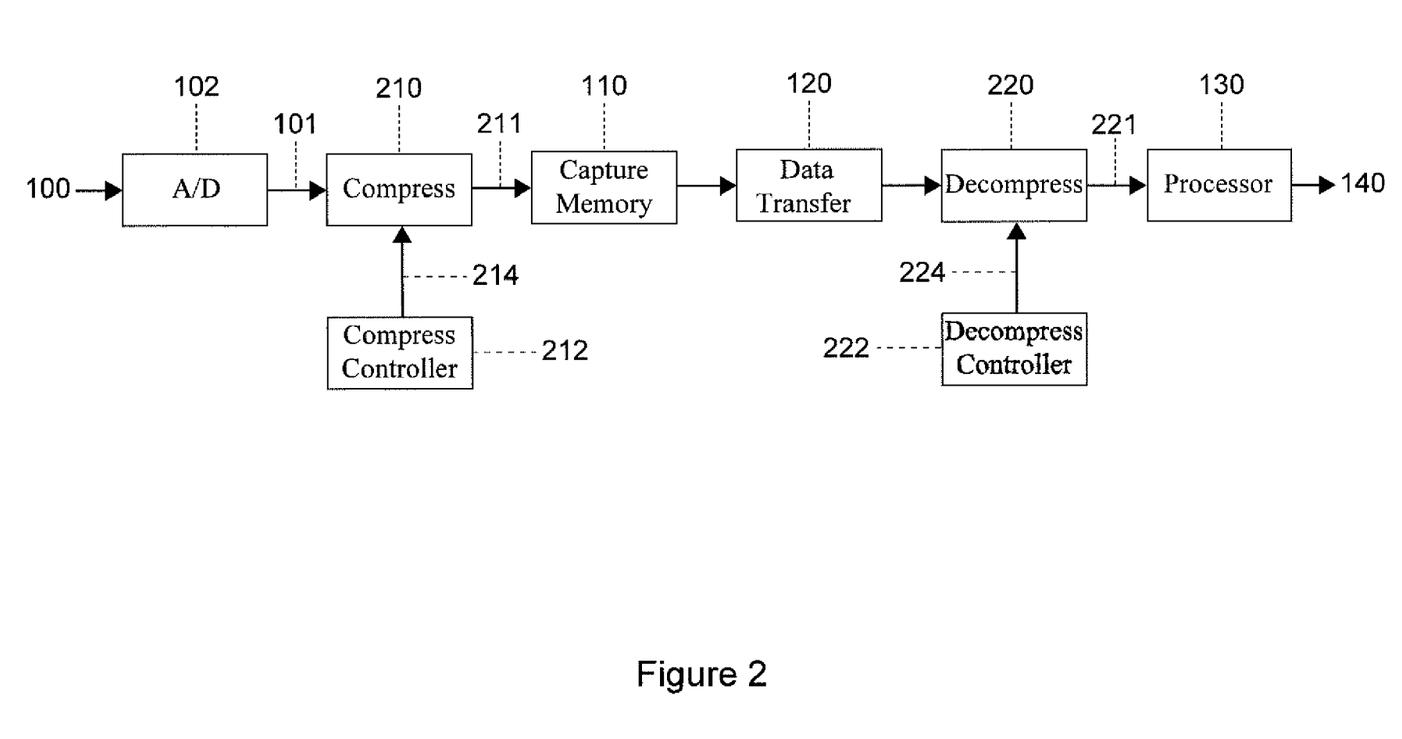
FIG. 2 is a block diagram of a system for capture and frequency analysis of a signal, in accordance with a preferred embodiment.

FIG. 2 is a block diagram of a preferred embodiment of the present invention. The ADC 102 is included when the input is an analog signal 100 and is not included when the input is a digital signal 101. The compressor 210 compresses the samples of the digital signal 101 to form compressed signal samples as compressor output 211. The compressed signal samples can be stored in capture memory 110 for later transfer over data transfer interface 120 to the decompressor 220. Embodiments for some applications may not require the capture memory 110, so that the compressor 210 provides the compressed signal samples to the data transfer interface 120. The decompressor 220 decompresses the compressed signal samples received from the data transfer interface 120 to form decompressed signal samples as decompressor output 221. The processor 130 transforms the decompressed signal samples to the frequency domain to form a frequency domain representation. Depending on the application, the processor 130 may provide the frequency domain representation as the processor output 140. The processor 130 can also perform additional operations on the frequency domain representation and provide the results at processor output 140. The compression controller 212 and decompression controller 222, both optional, provide for compression mode selection and parameters. In an alternative embodiment, the decompressor 220 can include a local memory for storing the compressed signal samples prior to decompression. The capture memory 110 can be any data storage device, including random access memory (RAM) or computer-readable media such as a disk drive. The data transfer interface 120 can include a bus, cable, network or other connection as appropriate for the application.

The compression controller 212 can provide selection of compression mode and respond to input from a user. The compression modes for compressor 210 include lossless modes and lossy modes. For example, under some circumstances compressor 210 will generate lossless-compressed signals, whose values after decompression by decompressor 220 will be identical to the original signal. In other circumstances, compressor 210 will generate lossy-compressed signals that require less storage and/or bandwidth than either the lossless-compressed signal or the original, uncompressed signal. In the case of lossy compression, several additional alternatives are available. Lossy compression may provide a compressed signal whose bandwidth or bit rate is user-specified. In other instances lossy compression may provide a compressed signal whose quality is user-specified. For lossy compression modes, parameters representing the desired the bit rate (including compression ratio) or signal quality (including SNR, distortion level, etc.) may be passed to compressor 210, via compression control 214. The decompression controller 222 can provide compression mode indicator and parameters to decompressor 220 via decompression control 224.

In a preferred embodiment for a bandlimited signal, the compressor 210 and decompressor 220 apply algorithms for compression and decompression described below. The algorithms include simple operations including inversion, addition and subtraction that can be implemented to perform compression or decompression in real time. Preferred embodiments of the compressor and decompressor described below are based on embodiments described in the '533 patent. However, other compression and decompression techniques can be used by compressor 210 and decompressor 220 without departing from the spirit and scope of the present invention.

Figure 7A:
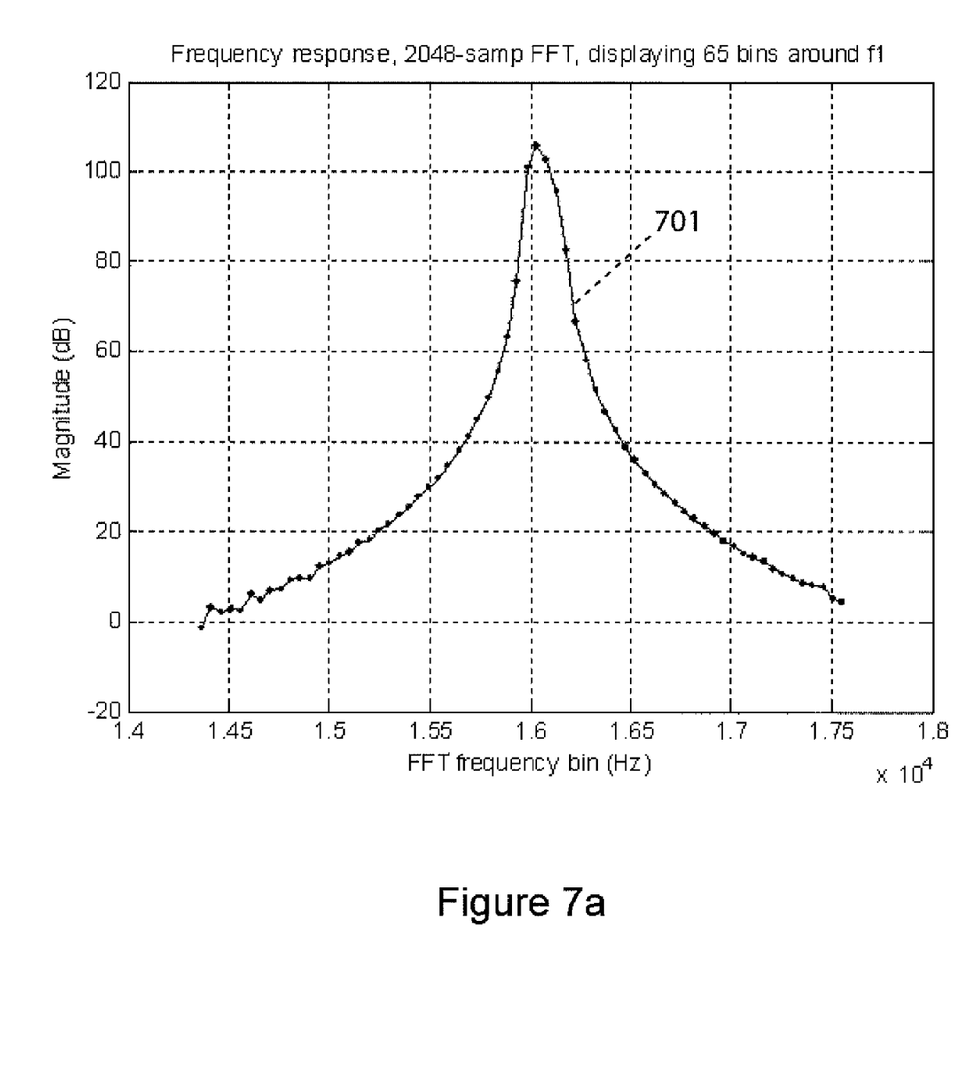
FIG. 7a is a plot of an example of the magnitude spectrum of resulting form a FFT applied to a signal with two closely spaced sine waves in noise where FFT length N=2048 samples.
Figure 7B:
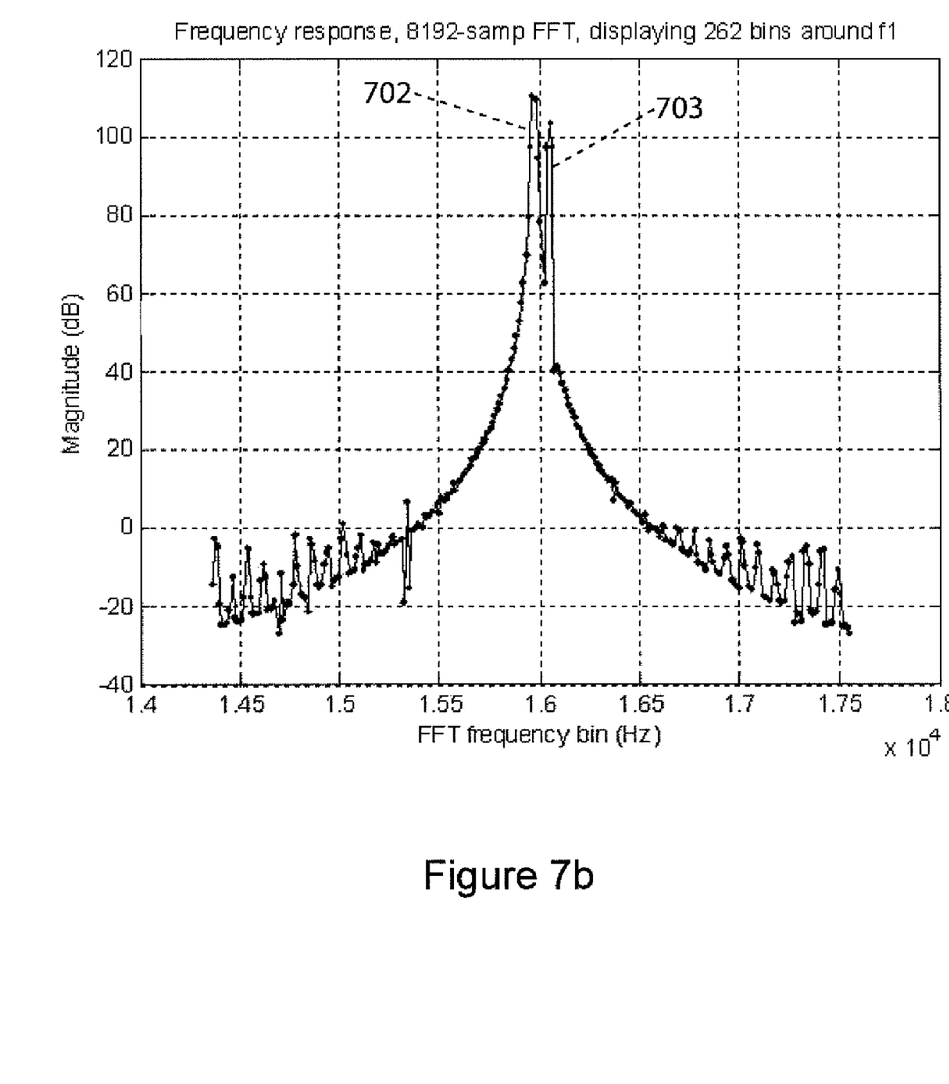
FIG. 7b is a plot of an example of the magnitude spectrum resulting from a FFT applied to a signal with two closely spaced sine waves in noise that had been compressed (fixed-rate lossy) and decompressed prior to the FFT, where FFT length N=8192 samples, in accordance with a preferred embodiment.

Embodiments of the technology include a spectrum analyzer used for examination of spectral composition of input signals such as electrical, acoustical or optical waveforms. A spectrum analyzer includes a display adapted to display data from the frequency domain representation such as illustrated in FIGS. 7a and 7b for example, and interactive tools for managing display of the frequency domain representation and measuring characteristics of the displayed representations. Such tools include graphical user interface tools for marking the displayed representation and making measurements based on such marking, peak detection tools, peak width measurement tools, window definition tools and the like. In addition, a spectrum analyzer includes resources for accepting the control parameter as user input such as a graphical input tool, a switch or other input tool, as part of a parameter file entered by programming, or resources to produce the control parameter automatically based on use of measurement tools supported by the interactive interface. Such a spectrum analyzer may include only the decompressor 220, while the compressor is coupled with a sampling device in communication with the spectrum analyzer.

Figure 3:
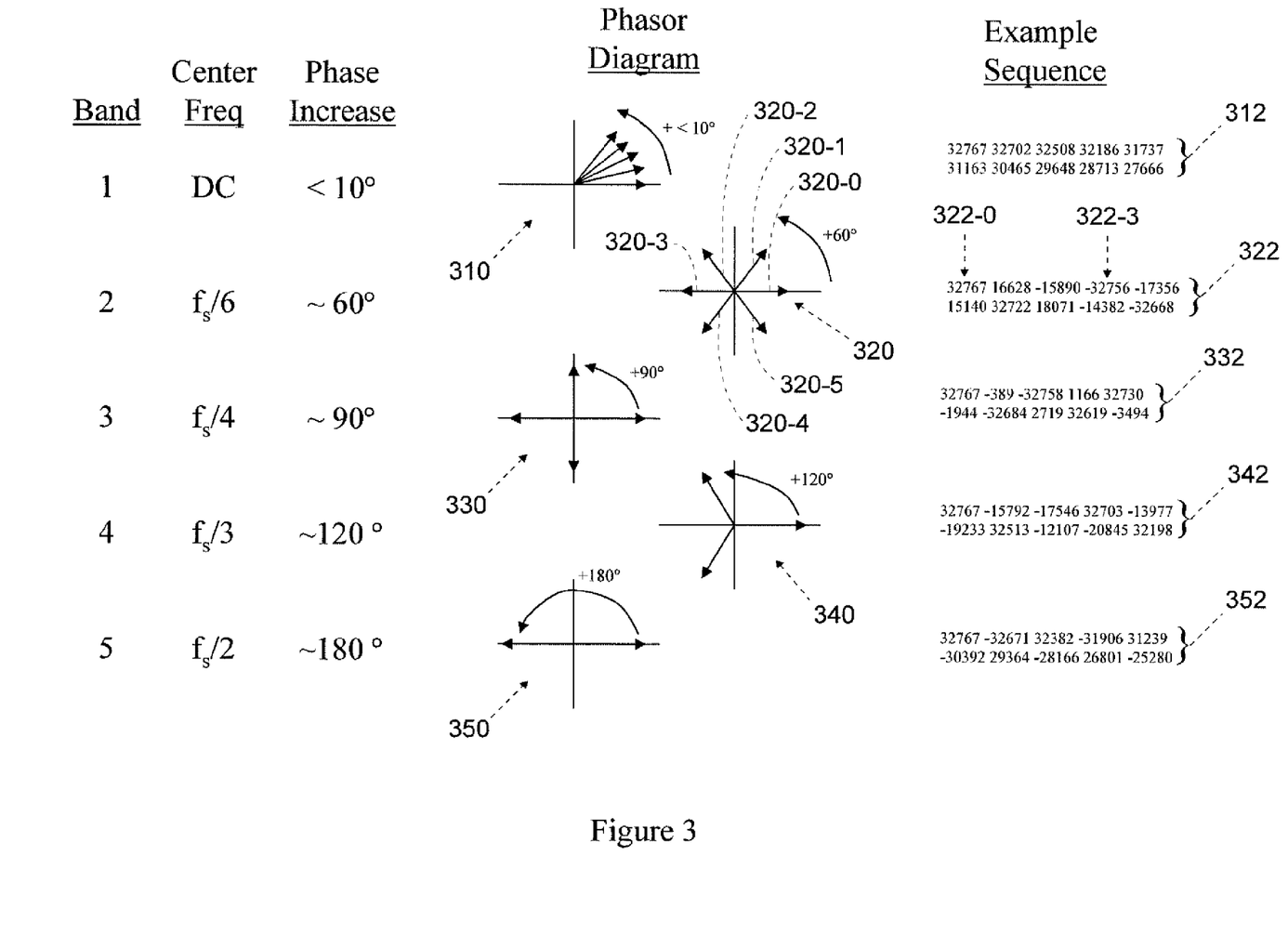
FIG. 3 gives examples illustrating the principles underlying a preferred embodiment for compression.

FIG. 3 gives examples that illustrate principles underlying the preferred embodiment for compressor 210 for compressing bandlimited signals with different center frequencies. Beginning with the example of a baseband signal, corresponding to row labeled "Band 1" in FIG. 3, the center frequency is near DC (0 Hz) and the phase increase between consecutive samples is less than 10 degrees. The first phasor diagram 310 shows that since the phase changes between consecutive samples are small, the magnitudes of the differences of consecutive samples will be relatively small compared to the magnitudes of the samples themselves. The first example sequence 312 corresponds to samples of a Band 1 baseband signal. Since the differences between consecutive samples are small relative to the sample magnitudes, calculating first or higher order differences, or differential encoding, creates difference samples with smaller data widths than the original samples. Compression using differential encoding approach is effective for the baseband (Band 1) example in FIG. 3.

FIG. 3 also gives examples of sampled signals where the center frequency is above DC, but below the Nyquist frequency, $f_s/2$. For Band 2, the center frequency is near $f_s/6$ and the phase increase between consecutive samples is about 60 degrees. The second phasor diagram 320 shows that pairs of samples separated by 180 degrees, or three sampling intervals, have similar magnitudes but opposite polarities, as illustrated by pairs of samples (320-0, 320-3), (320-1, 320-4) and (320-2, 320-5). Inverting one of the samples in the pair (or multiplying by −1) provides a close estimate of the other sample in the pair. The second example sequence 322 also shows that samples separated by three sampling intervals have similar magnitudes and opposite signs. For example, the value of sample 322-0 is 32767 and the value of sample 322-3 is −32756. For Band 2, operations on pairs of samples separated by three sampling intervals produce modified samples with smaller data widths. The operation of adding the samples in the pair together produces modified samples having smaller data widths that can be encoded more efficiently.

For the example of Band 3 in FIG. 3, the center frequency is near $f_s/4$ and the phase increase between consecutive samples is about 90 degrees. The third phasor diagram 330 shows that samples separated by 180 degrees, or 2 sampling intervals, have similar magnitude and opposite polarity. The third example sequence 332 also shows that every other sample has similar magnitudes and opposite polarities. For Band 3, adding together every other sample will result in modified samples with smaller data widths that can be encoded more efficiently than the original samples.

For the example of Band 4 in FIG. 3, the center frequency is near $f_s/3$ and the phase increase between consecutive samples is about 120 degrees. The fourth phasor diagram 340 shows that samples separated by 360 degrees, or 3 sampling intervals, will have similar magnitudes. The fourth example sequence 342 shows that every third sample has similar magnitudes. In this case, forming a difference between samples separated by 3 sampling intervals will give a modified sample with a smaller data width that can be encoded more efficiently than the original samples.

For the example of Band 5 in FIG. 3, the center frequency is $f_s/2$ and the phase increase between consecutive samples is about 180 degrees. The fifth phasor diagram 350 shows that samples separated by 180 degrees, or one sampling interval, will have similar magnitudes but opposite polarities. The fifth example sequence 352 shows consecutive samples have similar magnitudes and opposite polarities. In this case, adding two consecutive samples will form a modified sample with a smaller data width that can be encoded more efficiently than the original samples.

The above examples described for FIG. 3 show that data compression can be achieved by performing operations such as addition (or inversion followed by subtraction) or subtraction (or inversion followed by addition) on signal samples that are separated by 1, 2 or 3 sampling intervals, depending on the ratio of the sample rate to the center frequency. The resulting modified samples are then encoded to form compressed samples. Similar operations can be applied to samples that are separated by four or more sampling intervals, depending on the ratio of the center frequency to the sample rate, to produce modified samples with smaller data widths than the original signal samples.

Figure 4:
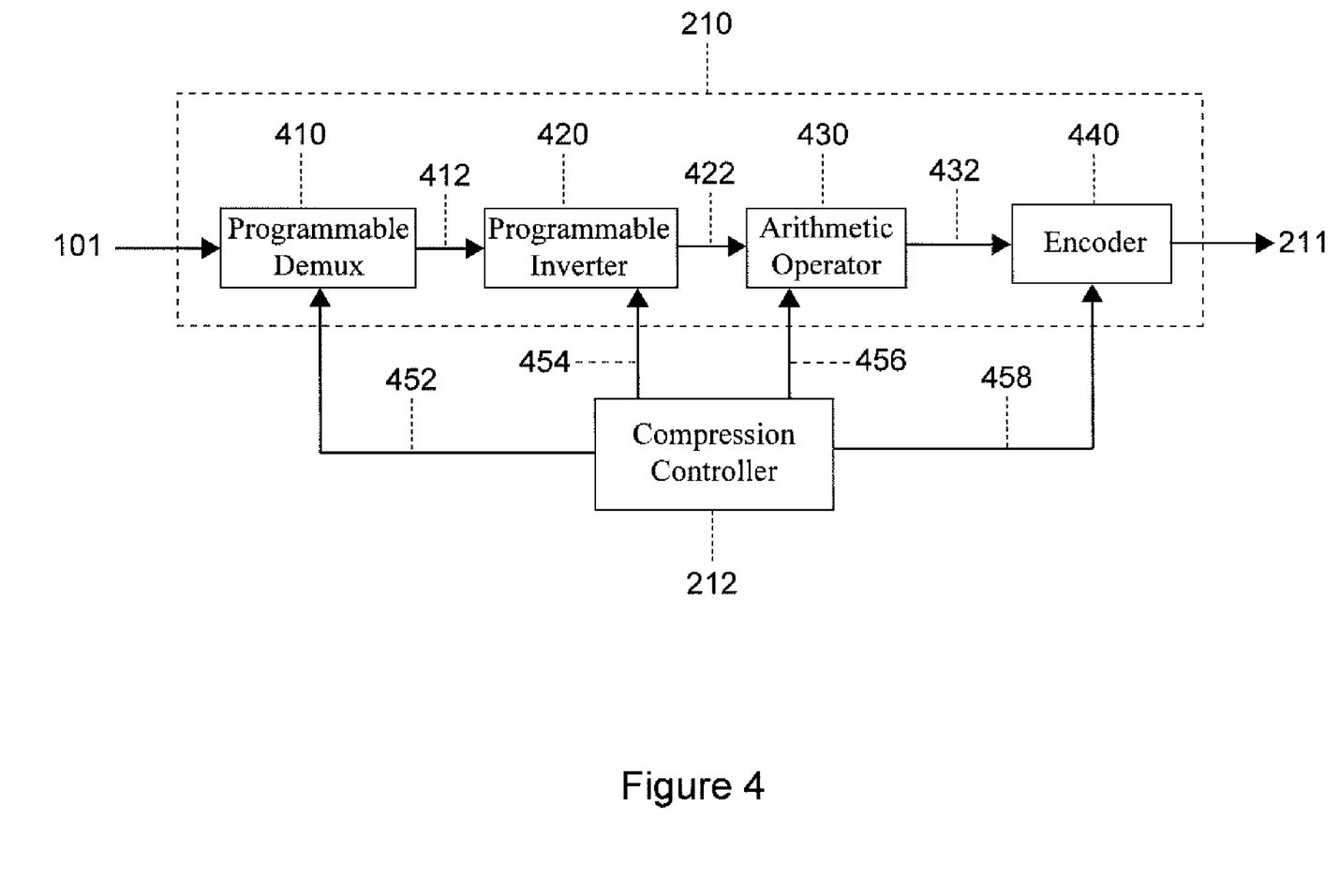
FIG. 4 is a block diagram of a preferred embodiment for compression.

FIG. 4 is a block diagram of a preferred embodiment of compressor 210 and compression controller 212. Programmable demultiplexer (demux) 410 selects samples of the digital signal 101 so that selected samples are separated by the appropriate number of sampling intervals according to compression control 452 to form demultiplexer output 412. Programmable inverter 420 inverts selected samples of the demultiplexer output 412 according to compression control 454. Arithmetic operator 430 performs addition or subtraction operations on pairs of operator input samples 422 according to compression control 456 to form modified samples 432. Arithmetic operator 430 can also be configured to perform higher order differences on the operator input samples 422. Encoder 440 encodes the modified samples 432 to form compressed signal samples at compressor output 211. Encoder 440 applies Huffman encoding or other encoding known in the art.

Figure 5:
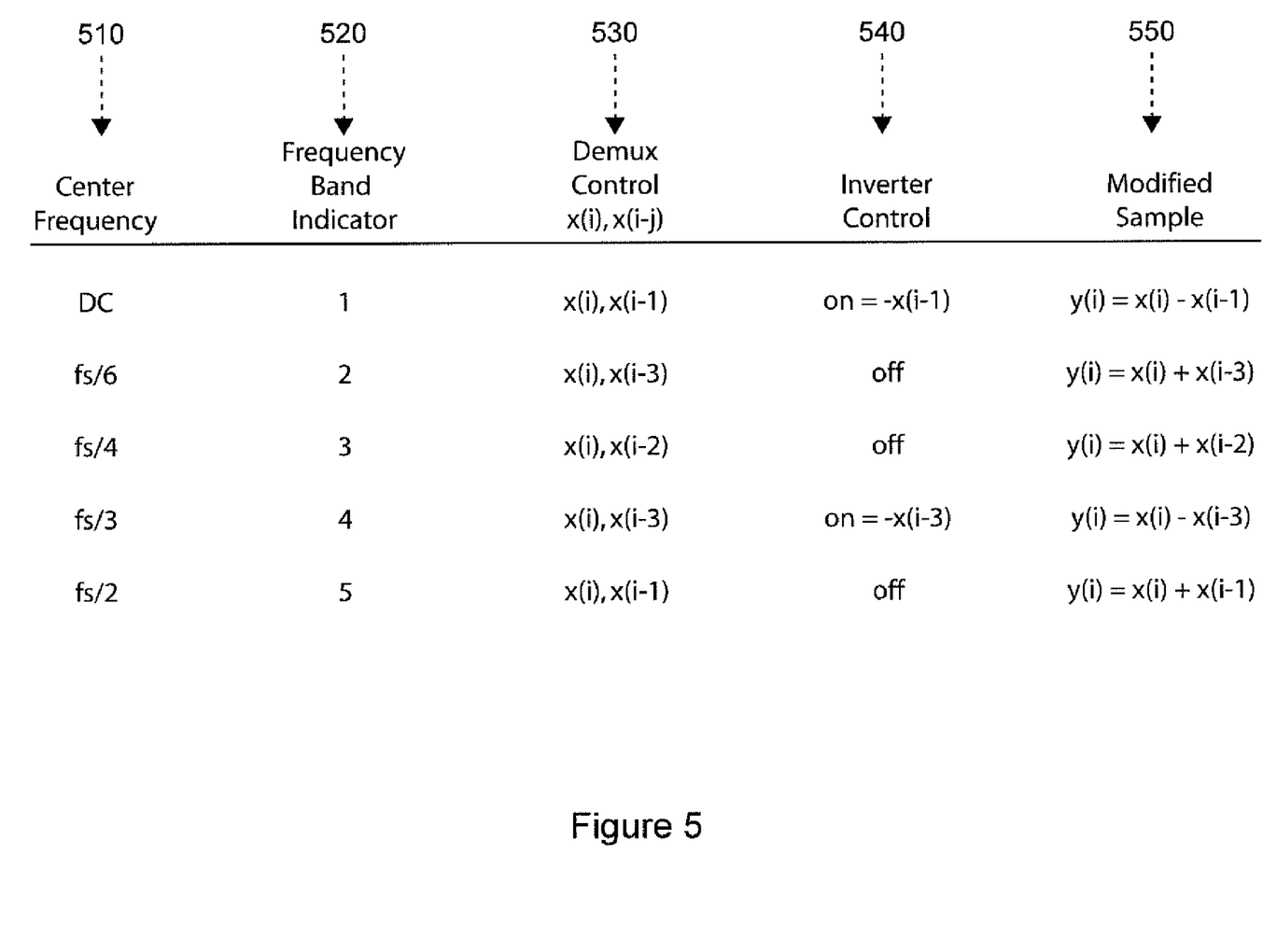
FIG. 5 shows the relationship of center frequency to the operations performed by the programmable demultiplexer, programmable inverter and arithmetic operator to produce modified samples, in accordance with a preferred embodiment.

The compression controller 212 provides control parameters to guide the operations of the compressor elements. The programmable demux 410, programmable inverter 420 and arithmetic operator 430 respond to the compression controls 452, 454 and 456, respectively, to perform the appropriate operations in accordance with the center frequency of the digital signal 101, FIG. 5 shows the operations that the programmable demultiplexer 410, programmable inverter 420 and arithmetic operator 430 perform to produce modified samples 432 based on the center frequency. The first column 510 gives the possible center frequencies for this example. The second column 520 gives a corresponding frequency band indicator for each center frequency. The indicators can be used as parameters for compression controls 452, 454 and 456. The third column 530 gives the different separations of samples x(i) and x(i-j) at demultiplexer output 412 that would be produced as a result of compression control parameter 452. The fourth column 540 shows the result of inversion under control by compression control parameter 454. When the inverter 420 is "on" the delayed sample, x(i-j) is inverted. The fifth column 550 shows the mathematical results of the arithmetic operator 430 that produce the modified samples 432, or y(i). The compression controller 212 also provides control of the encoder 440. The compression control parameter 458 can indicate a selected encoding technique from among multiple encoding options, including lossless encoding, such as Huffman encoding, other lossless encoding or lossy encoding.

FIG. 6 gives the sums or differences of signal samples x(i) and x(i-j) for the examples of FIG. 3 calculated in accordance with the preferred embodiment of FIGS. 4 and 5 for different center frequencies. These are the same signal samples used in the example sequences of FIG. 3. The samples in the DIFF rows in examples 512 and 542 and the SUM rows in examples 522, 532 and 552 have substantially lower magnitudes than the corresponding signal samples, or x(i). The DIFF samples and the SUM samples are examples of modified samples 432 that are input to encoder 440 in FIG. 4.

Alternative embodiments of compressor 210 for lossy encoding include the following configurations. One approach for lossy encoding is to reduce the data width, or dynamic range, of the samples to be compressed. A programmable attenuator can attenuate the digital samples 101 to reduce the data width prior to demultiplexing. Alternatively, programmable shifters can shift out one or more least significant bits from each sample of the digital signal 101, also reducing the data width. In another alternative, arithmetic operator 430 or encoder 440 can eliminate one or more least significant bits. Each of these alternatives for lossy encoding can be controlled by the compression controller 212. Additional alternatives for control of lossless and lossy compression can be based on a desired bit rate for compressed signal data at compressor output 211, a desired signal quality of the decompressed signal 221 or a characteristic of the frequency domain representation calculated by the processor 130, as described below.

Decompressor 220 reverses the operations of compressor 210 to reconstruct the samples of the digital signal 101 from the compressed signal samples. The compressed signal samples are decoded, for example by Huffman decoding, to form reconstructed modified samples. The inverse operations of the arithmetic operator 430 and the programmable inverter 420 are applied to the reconstructed modified samples. The resulting reconstructed signal samples, which may or may not be in chronological order, can be reordered into chronological order to form a reconstructed sample stream in the same order as the original digital signal samples. A multiplexer can perform the reordering operations.

In embodiments where the processor 130 performs a fast transform algorithm with decimation in time, the reconstructed signal samples, x'(i), can be reordered as appropriate for input to the fast transform algorithm, instead of chronological order. For a decimation in time FFT algorithm of length N samples there are N/2 FFT "butterfly" operators. Each butterfly operator has the two input samples that are separated by N/2 intervals, i.e. the $i^{th}$ butterfly operator has inputs x'(i) and x'(i+N/2) for i=[0, (N/2)−1]. The reconstructed signal samples x'(i) can be reordered as appropriate for inputs to the FFT butterfly operators.

Processor 130 can perform operations in addition to the FFT that are useful for the particular application. Processor 130 can multiply the reconstructed signal samples by weights, such as window function weights, prior to the FFT. Processor 130 can extend the number of input samples for the FFT by zero-padding or extrapolation by K samples to form M=N+K input samples. Since the FFT requires that the number of input samples be a power of 2, zero-padding or extrapolation can produce M input samples, where M is a power of 2. Nonlinear functions of the samples followed by FFT are often performed in detection and parameter measurement applications. Processor 130 can calculate nonlinear functions of the reconstructed signal samples x'(i), including magnitude, phase, power operations x''(i), delay-and-multiply operations x'(i)x'(i-j) and other operations known to those skilled in the art. After the FFT, the processor can perform additional operations on the samples X'(k) of the frequency domain representation. Functions useful for detection and parameter measurement applications include magnitude, phase, power operations X''(k), frequency-shift-and-multiply operations X'(k)X'(k-m) and other operations. Another step in detection and measurement applications is determining the location of a peak in the frequency domain representation. Peak detection often includes testing whether a function of X'(k), such as the magnitude, crosses a threshold.

In applications involving peak detection, lossy compression can be applied without compromising detector performance. The increased frequency domain resolution enabled by lossy compression can even improve detector performance. When an application has fixed capture memory resources, compression effectively increases the depth of capture memory 110. When an application has a limited data transfer bandwidth, compression effectively increases the bandwidth of data transfer interface 120. The detection of two closely spaced sinusoidal signals in noise is an operation underlying many signal processing applications, including multiple signals detection, parameter estimation and array based direction-finding. FIGS. 7a and 7b give examples showing improved detector performance when compressor 210 applies lossy compression. FIG. 7a shows the magnitude spectrum of a signal resulting from a FFT applied to a signal with two closely spaced sine waves in noise where FFT length N=2048 samples. A detector using this calculation would fail to detect the two signals. The frequency domain resolution is insufficient to distinguish two peaks corresponding to the two sinusoids, so only a single peak 701 is present. FIG. 7b shows the magnitude spectrum resulting from the FFT of length N=8192 samples applied to decompressed samples resulting decompression of fixed-rate lossy compressed signal samples with a compression ratio of 4:1. The methods of the preferred embodiment described above were applied for compression and decompression. Two peaks 702 and 703 are clearly distinguished at the higher resolution. Although increased noise level and spurs appear in other frequency locations, they do not diminish the ability to detect the peaks. A detection threshold can easily be chosen that would successfully detect the two peaks 702 and 703, whose peak magnitudes are both above 100 dB on the y-axis, while the noise floor is below 20 dB. The 4:1 compression in this example has only slightly degraded the noise floor, so the resulting peaks are 80 dB above the noise floor. Even a 20 dB dynamic range would still allow the peaks to be detected above the noise floor.

The FFT or other frequency transform of the decompressed signal samples provides the opportunity for feedback control to optimize compression performance. Processor 130 can analyze the frequency domain representation of the decompressed signal samples to produce optimized control parameters for compression controller 212, decompression controller 222 and/or other elements in the system of FIG. 2. The signal center frequency is a parameter that can be measured in the frequency domain and used to adjust the sample rate of the digital signal 101 or the sample rate applied by ADC 102 to analog signal 100 to improve compression performance. The amplitude range of modified samples is reduced when the center frequency $f_c$ equals or is close to the sample rate $f_s$ divided by a certain small integers. The examples given in FIG. 3 show the amplitudes of modified samples for center frequencies of $f_s/6$, $f_s/4$, $f_s/3$ and $f_s/2$. The adjusted sample rate would ideally result in the center frequency being centered in one frequency bin in the in signal spectrum, or the magnitude of the frequency domain representation. To find an optimum sample rate, the magnitude of the frequency domain representation, or signal spectrum, is analyzed to estimate the center frequency. The measured center frequency $f_c$ is used to select a sample rate where the ratio $f_s/f_c$ is as close as possible to the integers 3, 4 and 6 from candidate sample rates that meet the Nyquist criterion and implementation constraints. The compression controller 212 can provide the selected sample rate to the compressor 210 via compression control 214. The compressor 210 can resample digital signal 101 at the selected sample rate using well known techniques of multirate filtering prior to compression operations. In embodiments that include an ADC 102, the sample rate of the ADC 102 can be adjusted to the selected sample rate. These alternatives for selecting and adjusting the sample rate are also described in the '533 patent with respect to FIGS. 31 to 34 therein. The processor 130 can also analyze the signal spectrum to estimate the noise floor and SNR of the decompressed signal samples. The noise floor and SNR measurements indicate the signal quality of the decompressed signal. These can be used by compression controller 212 and decompression controller 222 to adjust appropriate compression control parameters for fixed-quality lossy compression. For example, the noise floor can be estimated from frequency domain values by forming a histogram of the magnitudes of the signal spectrum. The histogram bin with the highest number of occurrences is selected. The magnitude associated with the selected histogram bin provides the noise floor estimate. This technique for estimating the noise floor is also described in the '533 patent with respect to FIG. 18.

Correspondences between elements of the preferred embodiment described above for compressor 210, decompressor 220, compression controller 212 and decompression controller 222 and the figure elements of the '533 patent are described in the following. The compressor 210 of the preferred embodiment performs operations included in the compression subsystem 400 in the '533 patent. The programmable demultiplexer 410 and the programmable inverter 420 of the preferred embodiment perform operations that are included in the preprocessor 106, described in the '533 patent with respect to FIGS. 12-15. The arithmetic operator 430 and the encoder 440 of the preferred embodiment perform operations that are included in the compressor 110 of the '533 patent. The decompressor 220 of the preferred embodiment performs operations included in the decompression subsystem 440 in the '533 patent. The decoding and inverse of the arithmetic operations for decompression in the preferred embodiment are included in the decompressor 124 of the '533 patent. The programmable inverter and multiplexer for decompression of the preferred embodiment are included in the operations of the postprocessor 128 in the '533 patent, described with respect to FIGS. 16 and 17. The compression controller 212 and decompression controller 222 of the preferred embodiment perform operations included in the control block 144 of the '533 patent.

Figure 8:
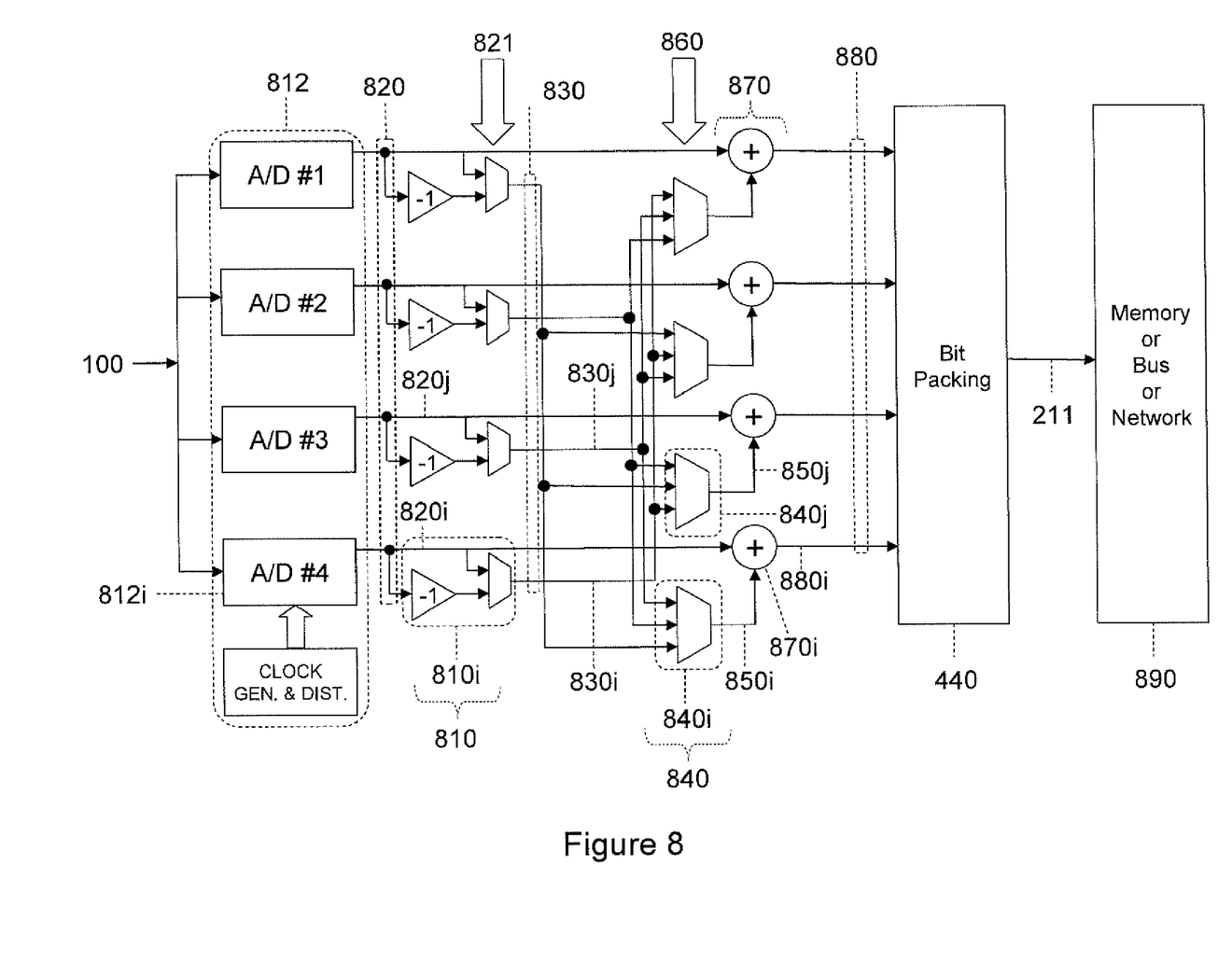
FIG. 8 is block diagram of a data conversion and compression system for a signal sampled by a TIADC, in accordance with an alternative embodiment.

When the ADC 102 comprises a TIADC, the compressor 210 can be configured to take advantage of the parallel structure of a TIADC. FIG. 8 is block diagram of a data conversion and compression system for a signal sampled by a TIADC. In this example, the TIADC 812 includes four parallel ADCs 812$i$. The parallel ADCs 812$i$ sample the analog signal 100 at consecutive sampling intervals to form a plurality of consecutive signal samples 820. Each signal sample 820$i$ is input to a corresponding programmable inverter 810$i$ of a plurality of programmable inverters 810. Each programmable inverter 810$i$ selectively inverts signal sample 820$i$ according to an inverter control parameter 821. The inverter control parameter controls inversion based on the ratio of the sample rate to the center frequency, as described with respect to inverter control column 540 in FIG. 5. A plurality of multiplexors 840 receives inputs selected from the plurality of inverter output samples 830. Each inverter output sample 830$i$ is distributed to at least 1 multiplexor 840$j$ (j not equal to i) corresponding to a signal sample 820$j$ that is separated by at least one sampling interval from signal sample 820$i$. Each multiplexor 840$j$ receives up to three inverter output samples 830$i$, (i not equal to j) corresponding to separations of up to three sampling intervals from signal sample 820$j$. Each multiplexor 840$i$ selects a multiplexor output sample 850$i$ from among the inverter output samples 830$j$, where j does not equal i, input to the multiplexor 840$i$. The multiplexor output sample 850$i$ is selected according to a multiplexor control parameter 860. The multiplexor control parameter 860 controls the sample selected based on the ratio of the sample rate to the center frequency, as described above with respect to demux control column 530 in FIG. 5. The plurality of multiplexor output samples 850 and signal samples 820 are input to a plurality of adders 870. Each adder 870$i$ adds multiplexor output sample 850$i$ with its corresponding signal sample 820$i$ to form a corresponding modified sample 880$i$. Each modified sample 880$i$ corresponds to one of the options for y(i) in the modified sample column 550 in FIG. 5, based on the ratio of the sample rate to the center frequency. Encoder 440 compresses the plurality of modified samples 880 to produce compressed samples 211. Encoder 440 applies bit packing strategies well known to those skilled in the art as described above with reference to FIG. 4. Compressed samples 211 can then be efficiently stored in memory or transferred over a data transfer interface, as indicated by block 890. Other alternatives for compression of signal samples output from a TIADC are also described in the '771 application.

An alternative embodiment for compressor 210 can use relatively simple lossy compression techniques, such as the removal of one or more least significant bits of samples, combined with bit packing. For example, a signal processing system incorporating 16-bit ADC for data acquisition can achieve 2:1 compression by storing the upper 8 bits of each 16-bit sample. Similarly, storing only the upper 4 bits achieves 4:1 compression. This compression technique suffers from a rise in noise floor and a corresponding decrease in SNR. While this embodiment is easily implemented, the distortion is significantly worse than that of preferred compression methods described above.

The present invention can be implemented in a system that includes signal capture followed by storage or transfer prior to frequency domain processing, including spectrum analyzer and signal detection systems. The present invention is applicable to a spectrum analyzer system that processes an input digital signal or includes an ADC to convert an input analog signal to a digital signal. A preferred implementation integrates the compressor of the present invention into the data acquisition portion of a spectrum analyzer system or other detection system. The compressor can be integrated into an application specific integrated circuit (ASIC) that includes an ADC. Alternatively, the compressor can be implemented in a separate, stand-alone ASIC that can be coupled to the output of an ADC chip. The stand-alone ASIC implementation can be fabricated using CMOS or other semiconductor process technology. Depending on the system architecture, the decompressor 220, decompression controller 222 and the processor 130 may be incorporated in the same device, such as an ASIC or programmable processor, or on separate devices. Incorporating the present invention in a system may increase the gate count and power consumption. However, the benefits of compression will decrease other system costs, such as the cost of storage to capture the compressed samples or the cost of a bus or network to transfer the compressed samples to decompressor 220 and processor 130 for FFT or other transform calculation.

Embodiments of the present invention can also be implemented in one or more programmable processors. The programmable processors include software/firmware programmable processors such as computers, digital signal processors (DSP), microprocessors (including microcontrollers) and other programmable devices, and hardware programmable devices such as complex programmable logic devices (CPLD), field programmable gate arrays (FPGA) devices. Depending on the type of programmable processor, the program implementing the operations of the present invention is represented by software, firmware, netlist, bitstream or other type of processor executable instructions and data.

Implementations of the present invention can perform compression or decompression in real time, that is, at least as fast as the sample rate of the digital signal. Compression and decompression operations include multiplexing operations, inversion operations and simple arithmetic operations including addition, subtraction and shifting. Embodiments using Huffman encoding also involve simple table look-ups.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

What is claimed is:

1. In a frequency analysis system, a method for producing a frequency domain representation of a number N of signal samples of a signal input to the frequency analysis system, the signal samples having a sample rate and an uncompressed bit rate, wherein the frequency analysis system includes a data interface having a capacity allocated for storage or transfer of the signal samples that is limited to fewer than N of the signal samples at the uncompressed bit rate, comprising:

compressing at least N of the signal samples in accordance with a control parameter to form a compressed signal that represents the at least N signal samples, the compressed signal having a compressed bit rate, wherein a compression ratio of the uncompressed bit rate to the compressed bit rate is greater than one;

transferring the compressed signal to the data interface;

retrieving the compressed signal from the data interface;

decompressing the compressed signal to form at least N decompressed signal samples; and calculating a frequency domain transformation of N of the decompressed signal samples to form frequency domain samples of the frequency domain representation having a frequency domain resolution that is less than or equal to the sample rate divided by N.

2. The method of claim 1, wherein the signal is an analog signal, the method further comprising:

converting the analog signal to a digital form sampled at the sample rate and the uncompressed bit rate to produce the signal samples.

3. The method of claim 1, further comprising:

measuring a characteristic of the frequency domain representation corresponding to a desired characteristic to form a measured characteristic; and adjusting the control parameter in accordance with the measured characteristic.

4. The method of claim 1, further comprising setting the control parameter based on a desired characteristic of the frequency domain representation, wherein the desired characteristic is a desired frequency domain resolution, a desired peak height, a desired noise level or a desired signal to noise ratio of the frequency domain representation.

5. The method of claim 1, further comprising:

selecting a compression mode from a set of alternative compression modes to form a selected compression mode, wherein the step of compressing operates in accordance with the selected compression mode.

6. The method of claim 1, wherein the data interface comprises a data storage device, the step of transferring further comprising storing the compressed signal in the data storage device and the step of retrieving further comprising retrieving the compressed signal from the data storage device.

7. The method of claim 1, wherein the data interface comprises a data transfer interface, the step of transferring further comprising transferring the compressed signal via the data transfer interface and the step of retrieving further comprising receiving the compressed signal from the data transfer interface.

8. The method of claim 1, wherein the frequency domain transformation is a discrete Fourier transform (DFT), a fast Fourier transform (FFT), a discrete sine transform (DST), a discrete cosine transform (DCT) or a z-transform.

9. The method of claim 1, wherein the step of calculating a frequency domain transformation further comprises:

extending the decompressed signal samples by K appended samples to form M extended signal samples, the M extended signal samples including the N decompressed signal samples and the K appended samples; and calculating the frequency domain transformation of the M extended signal samples to form the frequency domain representation, wherein the frequency domain resolution is equal to the sample rate divided by M.

10. The method of claim 1, wherein the step of calculating a frequency domain transformation further comprises:

applying a window function by multiplying the N decompressed signal samples by N weights of the window function to form N windowed signal samples; and calculating the frequency domain transformation of the N windowed signal samples to form the frequency domain samples.

11. The method of claim 1, wherein the step of calculating a frequency domain transformation further comprises:
calculating a nonlinear function of the N decompressed signal samples to form N modified signal samples; and
calculating the frequency domain transformation of the N modified signal samples to form the frequency domain samples.

12. The method of claim 1, wherein the step of calculating a frequency domain transformation further comprises calculating a nonlinear function of one or more of the frequency domain samples to form modified frequency domain samples, the modified frequency domain samples forming the frequency domain representation.

13. The method of claim 11, wherein the step of calculating a frequency domain transformation further comprises calculating a second nonlinear function of one or more of the frequency domain samples to form modified frequency domain samples, the modified frequency domain samples forming the frequency domain representation.

14. The method of claim 1, wherein the step of compressing at least N of the signal samples forms the compressed signal that represents the at least N signal samples at a rate that is at least as fast as the sample rate.

15. The method of claim 1, wherein the step of calculating a frequency domain transformation further comprises:
calculating a Fourier transform to form the frequency domain samples; and
calculating a magnitude of each of the frequency domain samples to form a magnitude spectrum, the magnitude spectrum forming the frequency domain representation; and including
displaying the magnitude spectrum on an interface including tools for analysis of the spectrum.

16. The method of claim 15, further comprising:
measuring a characteristic of the magnitude spectrum; and
adjusting the control parameter based at least in part on the characteristic of the magnitude spectrum.

17. The method of claim 1, wherein the step of calculating a frequency domain transformation further comprises:
calculating a transform to form the frequency domain samples; and
calculating a magnitude of each of the frequency domain samples to form a magnitude spectrum, the magnitude spectrum forming the frequency domain representation; and further comprising:
displaying the magnitude spectrum on an interface including tools for analysis of the spectrum;
using the tools to determine a peak in the magnitude spectrum; and
using the tools to measure a characteristic of the peak.

18. The method of claim 17, wherein the characteristic is a height of the peak, a width of the peak or a distance between the peak and a second peak in the magnitude spectrum.

19. In a frequency analysis system, an apparatus for producing a frequency domain representation with enhanced frequency domain resolution of signal samples of a signal input to the frequency analysis system, the signal samples having a sample rate and an uncompressed bit rate, the apparatus comprising:
a compressor coupled to receive the signal samples and compressing at least N of the signal samples in accordance with a control parameter to form a compressed signal that represents the at least N signal samples, the compressed signal having a compressed bit rate, wherein a compression ratio of the uncompressed bit rate to the compressed bit rate is greater than one;
a data interface coupled to receive the compressed signal and transferring or storing the compressed signal, wherein the data interface has a capacity allocated for storage or transfer limited to fewer than N of the signal samples at the uncompressed bit rate;
a decompressor coupled to receive the compressed signal from the data interface and decompressing the compressed signal to form at least N decompressed signal samples; and
a processor coupled to receive the decompressed signal samples, the processor including a transform processor that calculates a frequency domain transformation of N of the decompressed signal samples to form frequency domain samples of the frequency domain representation having a frequency domain resolution that is less than or equal to the sample rate divided by N, wherein the control parameter is based at least in part on a desired characteristic of the frequency domain representation.

20. The apparatus of claim 19, wherein the signal is an analog signal, the apparatus further comprising:
an analog to digital converter that samples the analog signal at the sample rate and the uncompressed bit rate to produce the signal samples.

21. The apparatus of claim 19, further comprising:
a compression controller coupled to receive the frequency domain representation and adjusting the control parameter provided to the compressor in accordance with a measured characteristic of the frequency domain representation corresponding to the desired characteristic.

22. The apparatus of claim 19, wherein the desired characteristic is a desired frequency domain resolution, a desired peak height, a desired noise level or a desired signal to noise ratio of the frequency domain representation.

23. The apparatus of claim 19, wherein the compressor operates in a compression mode selected from a set of alternative compression modes.

24. The apparatus of claim 19, wherein the data interface comprises a data storage device coupled to receive the compressed signal.

25. The apparatus of claim 24, wherein the data storage device comprises a memory or a computer-readable medium.

26. The apparatus of claim 19, wherein the data interface comprises a data transfer interface coupled to receive the compressed signal.

27. The apparatus of claim 26, wherein the data transfer interface comprises a bus, a cable or a network.

28. The apparatus of claim 19, wherein the frequency domain transformation calculated by the transform processor is a discrete Fourier transform (DFT), a fast Fourier transform (FFT), a discrete sine transform (DST), a discrete cosine transform (DCT) or a z-transform.

29. The apparatus of claim 19, wherein the processor further comprises:
a multiplication operator receiving and multiplying the N decompressed signal samples by N weights of a window function to form N windowed signal samples, the transform processor receiving the N windowed signal samples and calculating the frequency domain transformation of the N windowed signal samples to form the frequency domain samples.

30. The apparatus of claim 19, wherein the processor further comprises:
a nonlinear operator receiving the N decompressed signal samples and applying a nonlinear operation to form N modified signal samples, the transform processor receiving the N modified signal samples and calculating the frequency domain transformation of the N modified signal samples to form the frequency domain samples.

31. The apparatus of claim 30, wherein the processor further comprises:

a second nonlinear operator receiving one or more of the frequency domain samples and applying a second nonlinear operation to form modified frequency domain samples, the modified frequency domain samples forming the frequency domain representation.

32. The apparatus of claim 19, wherein the processor further comprises:

a nonlinear operator receiving one or more of the frequency domain samples and applying a nonlinear operation to form modified frequency domain samples, the modified frequency domain samples forming the frequency domain representation.

33. The apparatus of claim 19, wherein the compressor forms the compressed signal that represents the at least N signal samples at a rate that is at least as fast as the sample rate.

34. The apparatus of claim 19, including a display adapted for display of the frequency domain representation and the processor includes interactive tools for measuring characteristics of displayed frequency domain representations, and wherein the transform processor calculates a Fourier transform to form the frequency domain samples and the interactive tools include:

a magnitude operator that calculates a magnitude of each of the frequency domain samples to form a magnitude spectrum, the magnitude spectrum forming the frequency domain representation.

35. The apparatus of claim 34, further comprising:

a compression controller coupled to receive the magnitude spectrum and adjusting the control parameter provided to the compressor in accordance with a characteristic of the magnitude spectrum.

36. The apparatus of claim 34, wherein the interactive tools include:

a peak detector that determines a peak in the magnitude spectrum and measures a characteristic of the peak.

37. The apparatus of claim 36, wherein the characteristic is a height of the peak, a width of the peak or a distance between the peak and a second peak in the magnitude spectrum.

38. A spectrum analyzer for analysis of a frequency domain representation of a signal, comprising:

a data interface coupled to receive a compressed signal, the compressed signal corresponding to a signal input including signal samples having a sample rate and an uncompressed bit rate, the compressed signal having a compressed bit rate, wherein a compression ratio of the uncompressed bit rate to the compressed bit rate is greater than one;

a decompressor coupled to receive the compressed signal from the data interface and decompressing the compressed signal to form at least N decompressed signal samples;

a processor coupled to receive the decompressed signal samples, the processor including a transform unit that calculates a frequency domain transformation of N of the decompressed signal samples to form frequency domain samples of the frequency domain representation having a frequency domain resolution that is less than or equal to the sample rate divided by N;

a display adapted for display of data from the frequency domain representation; and a user interface unit for controlling display of the frequency domain representation on the display in response to user input, and for controlling measurement tools for measuring characteristics of a displayed frequency domain representation.

39. The spectrum analyzer of claim 38, wherein the signal samples in have been compressed accordance with a control parameter to form the compressed signal, and the decompressor is responsive to the control parameter, and the user interface unit includes resources for accepting the control parameter as user input.

* * * * *